INVENTOR
HARRY RUSSELL BRAND
BY

Fig. 2.

Feb. 6, 1951 H. R. BRAND 2,540,241
MEANS FOR PREPARING TAPES FOR CONTROLLING THE
OPERATIONS OF AUTOMATIC DISPENSING MECHANISM
Filed Feb. 17, 1948 9 Sheets-Sheet 3

INVENTOR
HARRY RUSSELL BRAND
BY
H. Dorsey Spencer

INVENTOR
HARRY RUSSELL BRAND

Feb. 6, 1951 H. R. BRAND 2,540,241
MEANS FOR PREPARING TAPES FOR CONTROLLING THE
OPERATIONS OF AUTOMATIC DISPENSING MECHANISM
Filed Feb. 17, 1948 9 Sheets-Sheet 9

Fig. 17.

INVENTOR
HARRY RUSSELL BRAND
BY
H. Dorsey Spencer

Patented Feb. 6, 1951

2,540,241

UNITED STATES PATENT OFFICE 2,540,241

MEANS FOR PREPARING TAPES FOR CONTROLLING THE OPERATIONS OF AUTOMATIC DISPENSING MECHANISM

Harry Russell Brand, New York, N. Y., assignor to Emily Mary Ann Brand, New York, N. Y.

Application February 17, 1948, Serial No. 8,974

10 Claims. (Cl. 346—33)

This invention relates to means for translating the operations of retail dispensing mechanism into records of such character that they may be used for controlling the operation of automatic warehouse dispensing mechanism to replenish stocks of various kinds of goods or commodities which have been depleted by the operations of said retail dispensing mechanism over a given period of time, as, for example, by a day's operations thereof.

In my copending applications Serial Nos. 705,137, filed October 23, 1946, now abandoned; 755,934, filed June 20, 1947; 766,123, filed August 4, 1947, now Patent No. 2,536,155, issued January 2, 1951, and 770,214, filed August 23, 1947, I have disclosed means for automatically dispensing commodities in self service stores, including, respectively, an order plate that may be set by the customer to actuate automatic mechanism to dispense in a predetermined succession a plurality of different items and also, if desired, a plurality of any one or more of said items; mechanism actuated by the order plate both for releasing the items to be dispensed from the storage spaces or bins in the retail establishment and for computing the amount due from the customer on the order, and mechanism, also controlled from the ordering station, for segregating one customer's order from another and for assembling all of the goods ordered by a customer and delivering them at a predetermined point, etc.

It will be apparent that, for the successful operation of automatic retail dispensing mechanism of the character disclosed in said copending applications, it is important that the bins, chutes or other storage devices from which automatic delivery of purchases to a customer are effected be kept supplied with the goods to be sold. Although it is usually possible to estimate approximately the amounts, and particularly the maximum amounts, of the goods of various kinds that will be dispensed in a day's operation of such a retail establishment, so that there will be little likelihood of any necessity for replenishing from a central warehouse any particular kinds of goods during a day's operations, or during such other period as may be chosen between ordinary replenishing operations, it is, of course, important, when taking goods from the warehouse to replenish the stock of the retail establishment, that the amounts, for example, the number of cases or other wholesale lots of each kind of goods required to replace those sold, be known.

Not only does the present invention aim automatically to record the sales of each kind of goods dispensed during any selected period of operation of the retail establishment, but it aims also to produce this record in such form that it may be used for controlling the automatic dispensing of the goods required for replenishment, in the required amounts, from the warehouse.

As is well known, goods in storage in warehouses are usually in case or crate lots and are usually stored in the ordinary cases or crates in which they came from the manufacturer or producer. At the retail establishment the cases or crates are usually opened and the items are placed in the bins or chutes, from which delivery is to be made, in such manner that individual delivery of the items can be made. If, for example, a case of canned goods comprises 24 cans, it is usually delivered from the retail chute to the customer in lots of one or more cans.

An important feature of the present invention is the provision of means for translating individual item purchases into the number of cases, crates or other wholesale lots required to replenish the stock thus depleted.

More particularly the invention aims to provide a combination of registering and recording mechanism operating in such manner that the respective totals of sales registered on the appropriate elements of the registering mechanism can later be converted by the recording mechanism into successive recordings upon a tape of such character that this tape may be transferred to an automatic warehouse dispensing mechanism and utilized to control the operations thereof. To this end there is provided in the registering mechanism of the present invention a registering element for each commodity dispensed by the retail dispensing mechanism on which the successive sales of the items of the various commodities are accumulated, these registering elements being preferably so connected to the dispensing mechanism that as the sales of individual items are accumulated they are converted into case, crate or other wholesale lot units, any excess of individual items over a complete case, crate or other wholesale lot unit being left on the item registers at the end of the day's operation to be carried over into the registering and recording operations of the succeeding day. When a day's operations are completed, means are provided according to the present invention by which the total case, crate or other wholesale lots of each commodity sold during the day can be caused to operate selected punches in a tape punching mechanism, whereby a record may be produced which, as above stated, can be used to control the operations of automatic warehouse dispensing mechanism in such manner that for each record on the tape a number of crates, cases or other wholesale lots will be dispensed from the warehouse corresponding to the number of cases, crates or other wholesale lots of the commodity sold during the day, thus facilitating replenishment of the stock of the retail establishment.

An important feature of the invention is the provision for recording the accumulated totals of the respective commodities required for replenishment of the retail stock in a predetermined sequence whereby the respective commodities may be dispensed from the warehouse either in the same sequence or in a reversal thereof.

Another important feature of the invention is the provision not only of means for recording the number of cases, crates or other wholesale lots of any commodity required to replenish the stock of a retail establishment after a day's operations, but also of means for associating with each such quantity record a code record of the particular commodity to be replenished.

Other objects, important features and advantages of the invention, to which attention has not hereinabove specifically been directed, will appear hereinafter when the following description and claims are considered in connection with the accompanying drawings, in which—

As hereinabove suggested, the invention is embodied in a mechanism which comprises a separate register for each commodity sold, such register comprising two elements, on one of which, the item register, is temporarily shown the number of individual units sold and on the other of which, the lot register, is shown the number of cases, crates or other wholesale lots sold, the two registers being so interconnected that, when the number of units sold requires a case, crate or other wholesale lot to replace them, the indicator of the lot register is advanced to one denomination to show the total number of crates, cases or other wholesale lots required. In the illustrative embodiment of the invention is also included recording mechanism, in the form of tape punching mechanism and a tape fed past the punches which can be operated to transfer the total accumulated on each lot register to the tape, the means for translating the accumulated totals to records on the tape being preferably constructed and arranged to effect the transfer of the totals for the various commodities in a predetermined sequence.

Before describing the tape-punching mechanism, illustrated particularly in Figs. 1 to 8 inclusive or, in other words, before describing the recording mechanism, the registering mechanism shown in Figs. 14 and 15 will be described, it being the accumulations on the different lot registers that control the successive settings of the punches of the recording mechanism.

Figure 17:
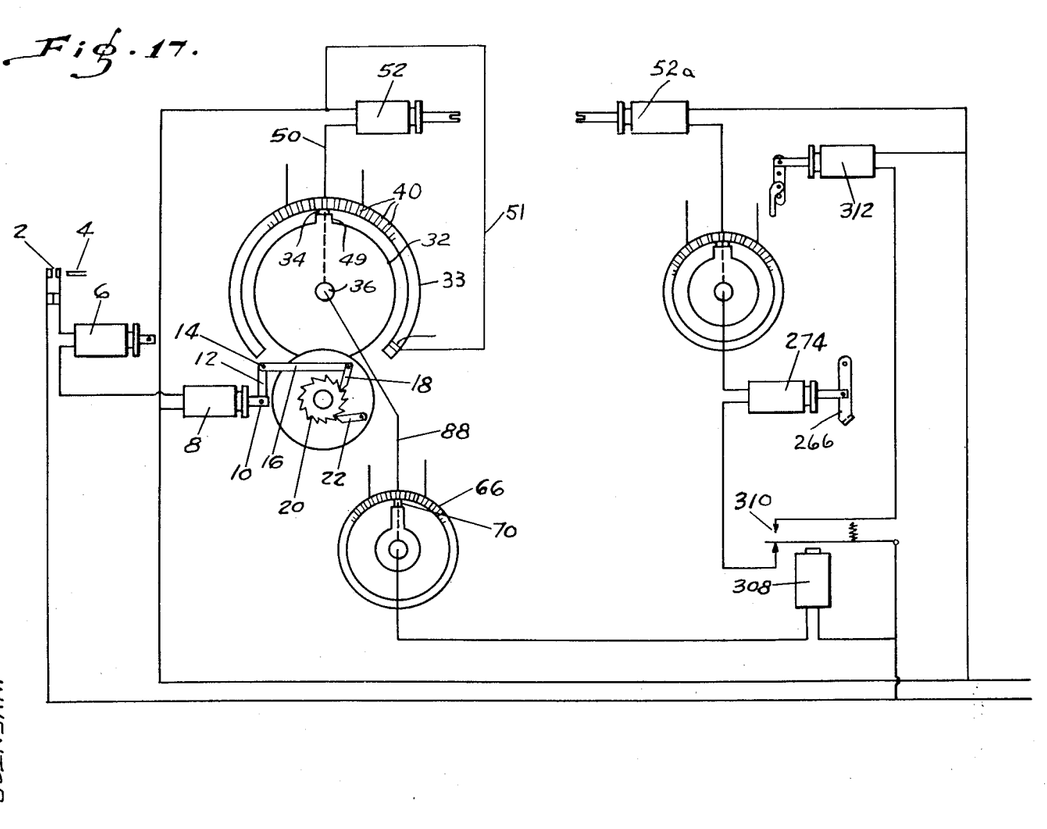
Figure 17 is a wiring diagram showing the wiring connections between the commodity selector switch, the quantity registering device, the punching mechanism for recording the quantity registered, the commodity number selector switch, the punching mechanism for recording the commodity code number, a solenoid for controlling the punching mechanism and the relay which closes the circuit to the punching mechanism control solenoid. The wiring diagram also shows the connection between the commodity selector switch at the dispensing mechanism, the solenoid controlling the dropping of the particular commodity selected and a solenoid, in series with the aforementioned solenoid, for controlling the quantity registering device.

As shown in the wiring diagram, Figure 17, whenever the switch 2, which controls the release of a selected commodity from its chute, is closed, for example, by a key-operated pin 4 or by a pin permitted to pass through a hole in an order plate in the manner more fully disclosed in my copending application Serial No. 705,137, filed October 23, 1946, the circuit thus completed includes not only the solenoid 6, that effects the release of the selected commodity, but also the solenoid 8, the plunger of which is pivotally connected at 10 to the short arm 12 of a bellcrank fulcrumed at 14. The long arm 16 of the said bellcrank carries a pawl 18 engaging successively the teeth of a ratchet wheel 20 of the item register, said ratchet wheel having thereon a number of teeth corresponding to the number of items of the selected commodity necessary to make up a case, crate or other wholesale lot. As shown in Figure 14, the ratchet wheel 20 has twenty-four teeth indicating that the case, crate or other wholesale lot of the particular commodity, the sales of which it is accumulating, comprises twenty-four items. A detent 22 insures turning the ratchet 20 in one direction only.

Attached to the ratchet wheel 20 and turning therewith on the shaft 24 is a disc 26 which carries a pin 28, adapted, on each rotation of the disc 26, to engage one of the recesses 30 in a second disc 32 which carries a contact member or brush 34 for closing punch-selecting circuits in the manner hereinafter to be described.

The disc 32, which with its brush 34 constitutes the principal element of the lot register associated with each item register, is mounted on a shaft 36 concentric with the inner wall of an elongated cylinder 33 made up of alternate segments of insulation 38 and conductor plates 40. The conductor plates 40 and insulation segments 38 are common to all of the lot registers but brush 34 has a connection to a separate circuit closing contact so that only one lot register functions at one time to select and operate the appropriate commodity quantity recording punch.

It will be seen that turning of the disc 32 in the stepwise manner just indicated, that is, sufficiently to move one of the depressions 30 out of the path of movement of the pin 28 and to bring the next one into the path of movement will cause the brush 34 to be moved in succession from one number registering conductor plate to the next. As shown in Figure 14, the brush has there been moved to the 16th conductor plate from its zero position which would be at the insulation 38². This would indicate that at the time the register stopped at the position shown in Figure 14, at least 16 full cases, crates or oether wholesale lots were required to replenish the retail store stock of the particular commodity represented by this lot register.

Figures 14, 16:
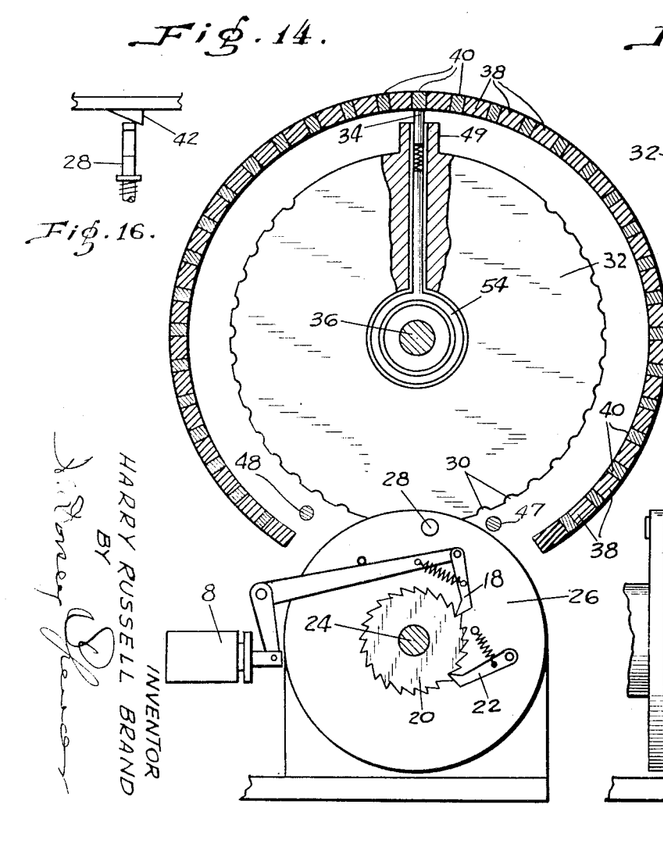
Figure 14 is a section on the line 14—14 of Figure 15 showing the individual item and case or crate registering elements of the registering part of the mechanism of the present invention.
Figure 16 is a plan detail of the mechanism for withdrawing the transfer pin under certain conditions.

When the disc 26 of the item register stops with its pin 28 in the full line position shown in Figure 14, that is, just after it has completed the turning of the disc 32 one notch, no trouble will be encountered in the re-setting of the disc 32 to 0, since the disc 32 can turn freely past the pin 28. If, however, the pin 28 had stopped in the dotted line position shown at the left of the full line position of this pin in Figure 14, that is, when the ratchet has accumulated twenty-three individual items and the pin 28 has entered the depression 30, preparatory to advancing the disc 32 one notch when the 24th item has been dispensed, then the pin 28 would be in such position that it would prevent the re-setting of the disc 32 to 0 position, that is, with the brush 34 on the insulation 38², were it not for the arrangement now to be described.

To prevent such locking of the disc 32 by the pin 28, a cam or wedge 42, such as shown in plan in Figure 16, is provided in the path of the end of the pin 28, up which it rides as the disc 26 turns from the 23rd to the 24th item. As the end of the pin 28 rides up the incline or wedge 42 against the tension of the spring 44, which tends to hold it in the position shown at the left in Figure 15, it brings the notch 46 in the pin into position beneath the disc 32, so that the disc 32 is free to turn in this notch until the pawl 18 again advances the ratchet wheel 20 one tooth.

It will be noted that the notch 46 in the pin 28 is not deep enough to prevent the pin operating to perform its function when it rides up from the dotted position shown at the left in Figure 14 through the arc necessary to bring it into the full line position shown in Figure 14. As the pin 28 rides up through this arc when the disc 26 is moved to register the 24th item, it will again engage a notch 30 in the disc 32 and effect the turning of the disc 32, and with it the brush 34, one step. It will thus be seen that, while the notch 46 in the pin 28 permits the re-setting of the disc 32 to bring the brush 34 back to its zero position at the end of a day's operations, if there are twenty-three items accumulated on the ratchet 20 at that time, they will be carried over to the next day's operations and as soon as an additional item has been added thereto, to make a case or crate unit, the movement of the pin 28 from its dotted line position in Fig. 14 to its full line position will effect the advancement of the brush 34 to the No. 1 contact plate 40 of the cylinder 33, thus indicating that one crate of the commodity is now required to replace the twenty-four items dispensed. Stops 47 and 48, engaging the boss 49 on the disc 32 which surrounds the brush 34, limit the angular movements of the disc 32 of the lot register.

Each of the conductor plates 40 except the first one is provided with a connection 50 to the appropriate solenoid 52 of the punch-setting mechanism so that the punch which is appropriate to the number of cases or crates indicated by the position of the brush 34 may be set by its connected solenoid. As above pointed out these conductor plates 40 are common to all the lot registers. The connection 51 from the first conductor plate goes directly to the source of current since a tape punching is not needed for a single lot.

Figure 15:
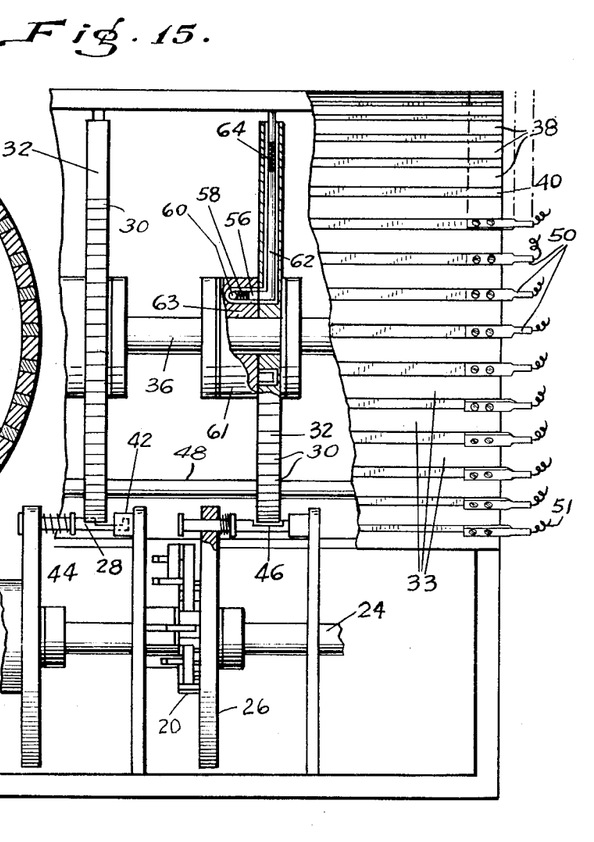
Figure 15 is a side elevation of the registering mechanism of the present invention with some parts shown in section and some parts broken away to show the interior structure.

As shown more particularly in Figs. 14 and 15, the discs 32 of the lot registers are arranged to turn on a stationary shaft 36 and the electrical connection to the brush 34 may be established through an armature ring 54 engaged by a brush 56 held thereagainst by a spring 58 which, in turn, is in electrical contact with the circuit terminal wire 60 for the particular lot register. The wire 60 and brush 56 are carried by a stationary collar 61 from which they are insulated by insulation 63. An arm 62, integral with the armature 50, and extending radially therefrom completes the electric circuit to the brush 34 through a spring 64, which is a part of the circuit and which holds the brush against the inner face of the cylinder 33 made up of the alternate segments of insulation 38 and conductor bars 40.

As hereinabove suggested, each commodity dispensed has, within the aforementioned cylinder, a lot register comprising a disc 32 and brush 34 appropriate to itself and has also the mechanism for effecting a step-by-step movement of the brush 34 over the conductor bars 40, said mechanism including a pawl-actuating solenoid 8, a ratchet wheel 20, a disc 26 and a pin 28 engaging notches 30 in the disc 32 in succession.

As also above suggested, the mechanism just described constitutes the item and lot registers for each commodity dispensed, the items being converted, so far as possible, into cases, crates or other wholesale lots of the commodity dispensed, there being a seperate register for each commodity. The total of cases, or other wholesale lots shown by the position of the brush 34 of the lot register can be translated into a record on a tape for controlling the operations of a warehouse dispensing machine, leaving any excess over full cases or crates on the ratchet wheel 20 of the item register to be carried over to the next day's operation.

This transfer of the amounts of the respective commodities required to replenish the stock of the retail establishment is preferably effected in a predetermined commodity sequence. To this end a series of contact plates 66, arranged in the wall of a cylinder 67 spirally about the axis thereof and separated by insulating portions 68 of said wall, are arranged to be engaged successively by a brush 70 travelling in a corresponding spiral path over the inside face of said cylindrical wall, such travel being brought about by mounting the brush 70 in an arm 72 having a hub 74 keyed in a spline 76 in a shaft 77 to which is also keyed a driving pulley 78 by which the shaft 76 is driven. The hub 74 is so locked by its key to the spline 76 that it not only turns with the shaft 77 but moves longitudinally therewith. The key of the driving pulley 78 is slidable in the spline 76 and the pulley 78 is confined against longitudinal movement with the shaft 77 between bosses 80 and 82.

The shaft 77 is mounted in bearings in two end plates 84 and 86, between which the contact cylinder 67 is fixed, and is threaded in that part thereof which extends through the plate 86, so that, as it turns, it moves in one direction or the other through said plate 86 and thus carries the brush 70 in a spiral path over the inside wall of the contact cylinder 67 throughout the length thereof.

Figures 9, 10, 11:
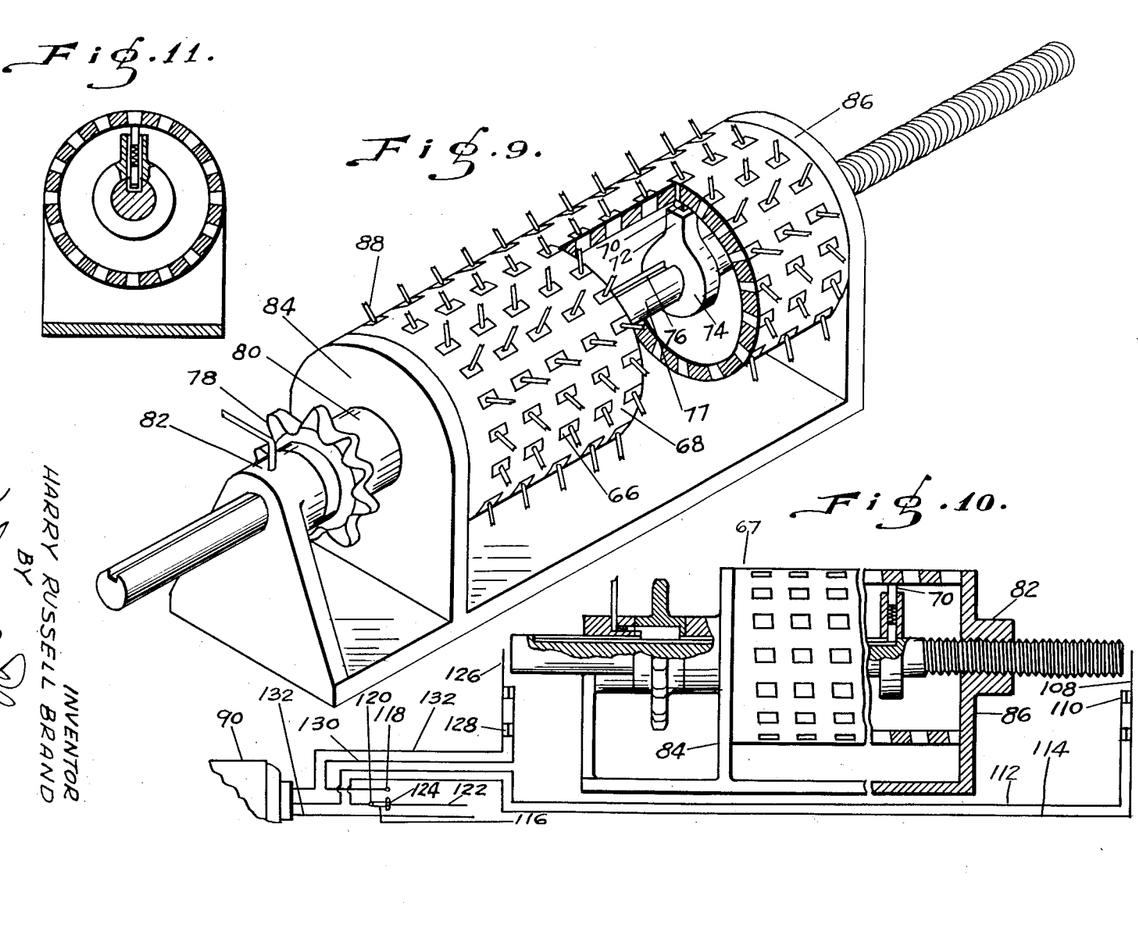
Figure 9 is a perspective view of parts broken away to show the brush construction of the commodity selector switch by which the punches for recording the required replenishments of the respective commodities are successively actuated.
Figure 10 is a wiring diagram illustrating the automatic control through stop switches of the forward and reverse movements of the commodity selector switch of Figure 9.
Figure 11 is a transverse section through the commodity selector switch of Figure 9.

At the end of each tape-punching operation the shaft 76 is returned to the left hand limit of its movement, see Figure 10, thus returning the brush 70 to the left hand end of the contact cylinder 67, in position to engage the first one of the contact plates 66 as it again starts its circuit closing spiral path of travel.

Figure 1:
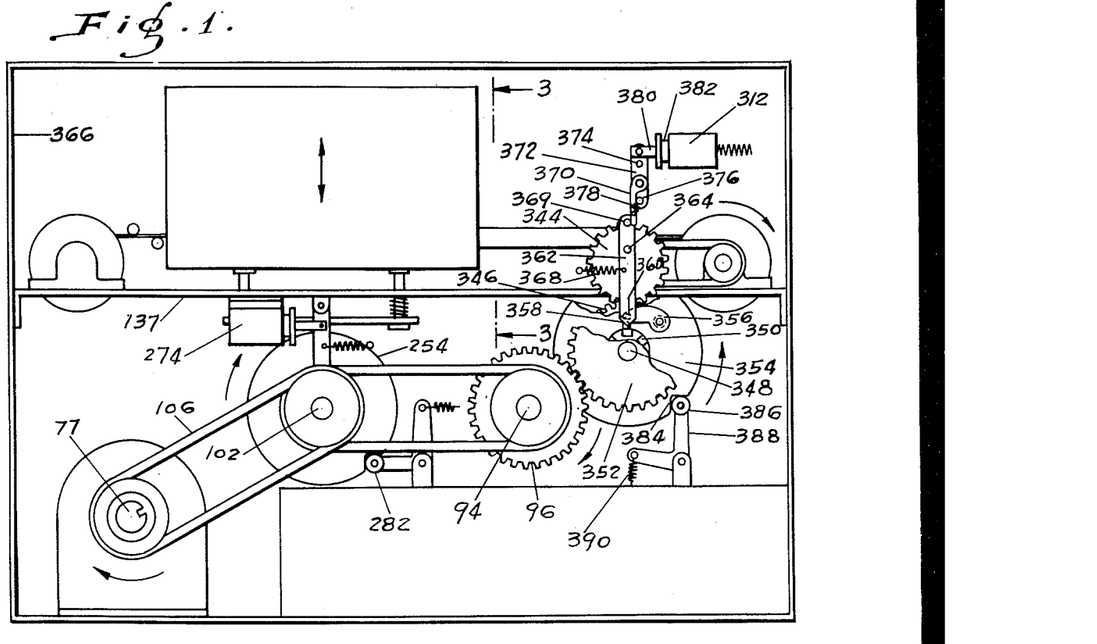
Figure 1 is a side elevation of mechanism embodying the present invention.
Figure 2:
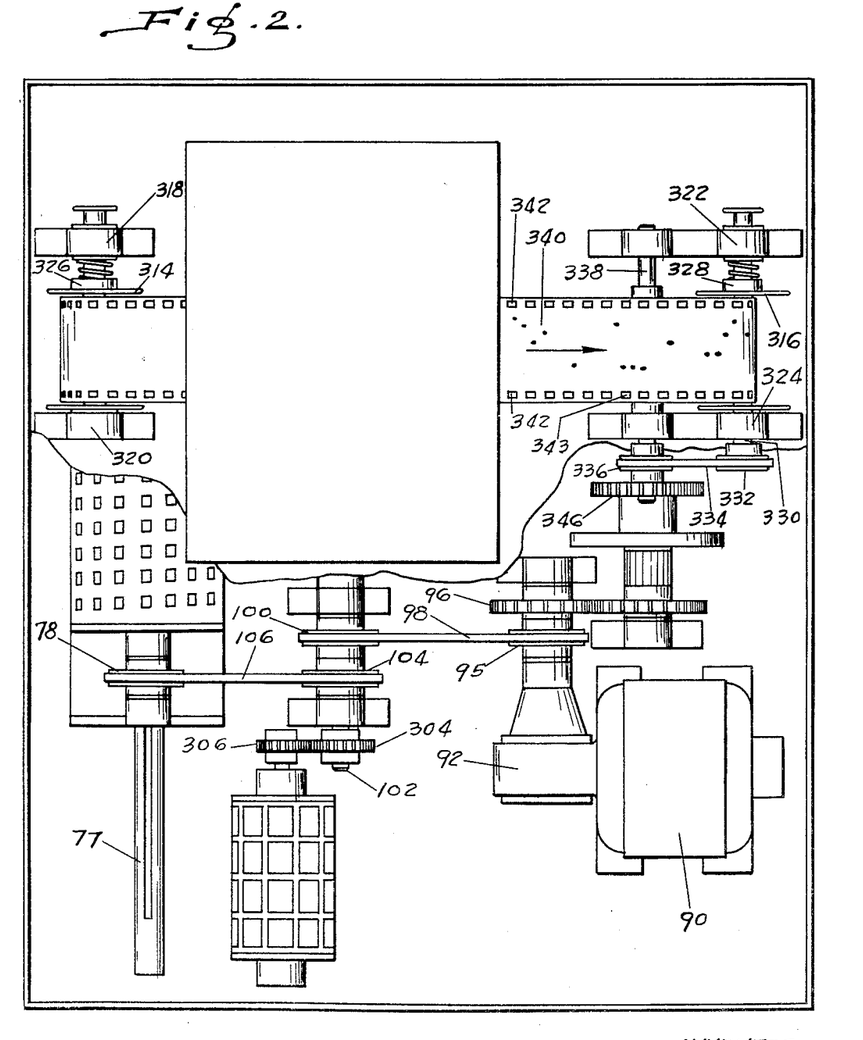
Figure 2 is a plan view of the mechanism shown in Figure 1 with parts of the housing broken away to show parts otherwise concealed.

As shown in Figures 1 and 2, the shaft 77, which effects the movement of the brush 70 spirally over the inner face of the contact cylinder 67, supported between the end plates 84 and 86, is driven through connections to a driving motor 90. As herein shown, the electric motor 90 is connected, through a worm and screw gearing, not shown, in a housing 92, with a shaft 94 on which are mounted and connected thereto to turn therewith any suitable driving pulley 95 and 96. As shown in Figures 1 and 2, the pulley 95, which may be a V-belt pulley, is connected by a V-belt 98 with a driven pulley 100 on a shaft 102 which has thereon a second driving pulley 104 that may be either a V-belt pulley or a sprocket wheel according as desired. In Figure 1 it is shown as a V-belt pulley connected by a V-belt 106 with the pulley 78 for driving the shaft 77, this pulley being shown in Figure 2 as a V-belt pulley instead of as a sprocket wheel, as in Figure 9.

From the foregoing description it will be seen that when the motor 90 is operating it will drive the shaft 77 and move the brush 70 through its spiral path over the contacts 66 of the cylinder 67, that is, over the inner faces thereof. This movement will continue, as shown more fully in the wiring diagram in Figure 10, until the shaft 77 has moved far enough to the right to carry the brush 70 into contact with the last one of the contact members 66. At this point the end of the shaft 77 will engage an arm 108 of a switch 110 and break the circuit to the electric motor 90, which had been established through said switch 110 and the wires 112 and 114 by the movement of the switch arm 116 from the contact 118 to the contact 120 in Figure 10, the switch arm 116 being connected to the positive side 122 of the electric circuit at point 124. When the shaft 77 has been driven to the right in Figure 10 by its connections to the motor 90, the left hand end of said shaft 77, which has theretofore been in engagement with the arm 126 of the switch 128 and has been holding said switch open, permits said switch 128 to close, thus making possible the establishment of a reversing circuit through the motor 90, by the swinging of the switch arm 116 so that it bridges the gap between the points 118 and 124. This establishes a circuit from the positive side 122 through 124 the arm 116, the contact 118, one side 130 of the circuit closed by the switch 128, through the other side 132 of this circuit back to the motor 90 and from the motor 90 back through the line 132 to the negative side of the circuit.

As shown in the wiring diagram in Figure 17, each contact plate 66 is connected by a wire 33 with a brush 34 of one of the commodity registers, the connection being through the disc 32 in the manner hereinabove described. As also hereinabove set forth, the position of the brush 34 on one of the contact plates 40 indicates the number of cases or other wholesale lots of the commodity represented by that brush that have been dispensed during the day. The connection between the particular contact plate 40, on which the brush 34 is resting, through its wire 50 to one of the solenoids 52 will determine the punch that will be allowed to operate when the tape-punching mechanism is actuated.

The tape-punching mechanism is shown particularly in Figures 1 to 8 inclusive and, as shown, comprises a series of punches 134 sliding through upper and lower guides in a housing 136 supported upon a horizontal partition plate 137 in the main housing and each held against the upper guide by a spring 138 engaging a collar 140 on the punch. In the lower part of the housing 136 is a tape guide 142 which guides the tape into position to be punched, the lower wall of the tape guide having openings 144 therein registering with the punch-guiding openings in the housing 136, those punches selected entering the openings 144 as they pass through the tape.

Figure 3:
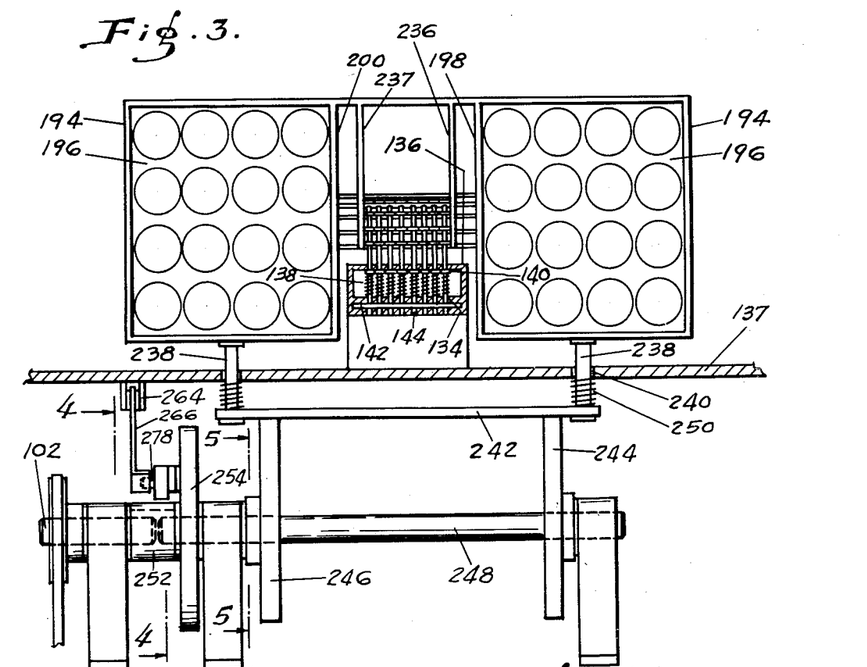
Figure 3 is a section on the line 3—3 of Figure 1 showing details of the punching mechanism.
Figure 6:
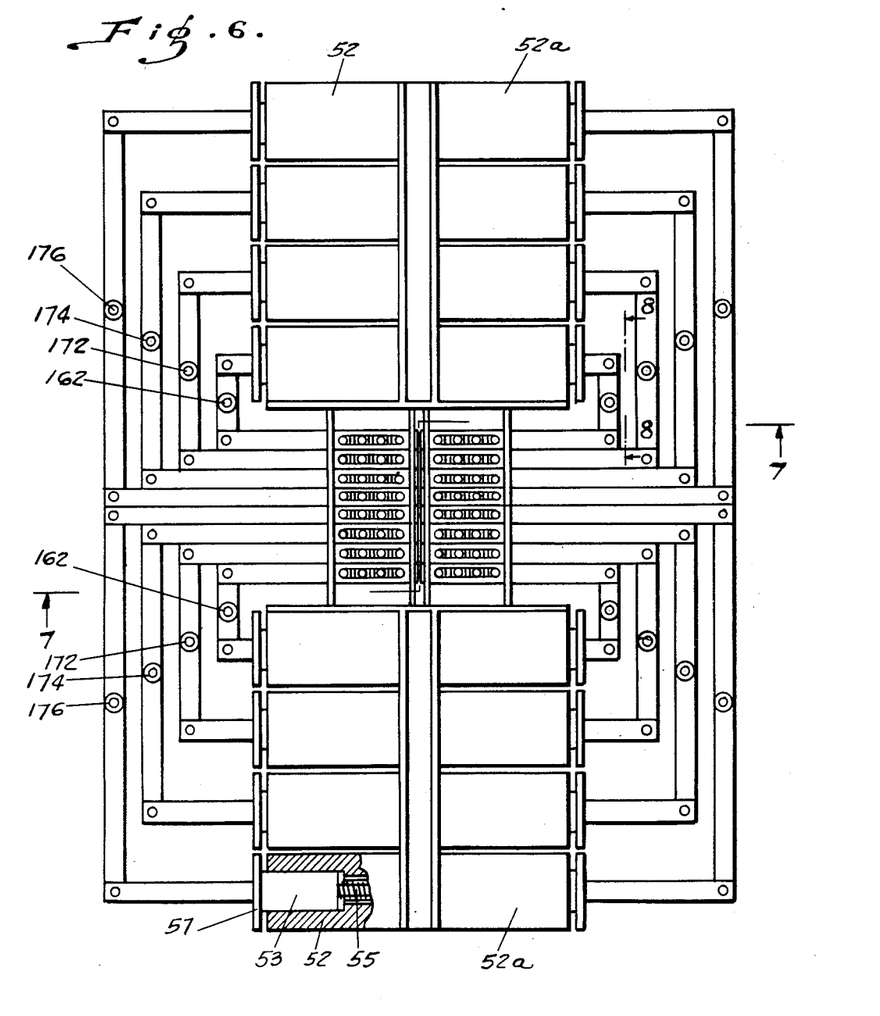
Figure 6 is a plan detail of the punch-setting mechanism.
Figure 7:
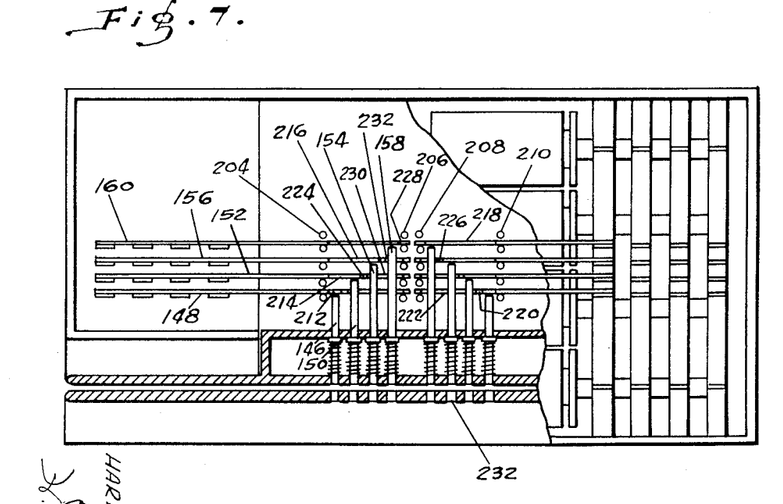
Figure 7 is a section on the line 7—7 of Figure 6.

As shown in Figures 3 and 7, each of the punches 134 has a stem extending a considerable distance above the housing 136. The punches which are controlled by the position of the brushes 34 on the cylinder 33, that is, the punches which are controlled by the solenoids 52 at the left hand side of Figures 3, 6 and 7, are arranged in four rows of eight punches each, that is, thirty-two punches altogether and the extending stems 146 of the outermost row are the shortest and cooperate with slides 148 controlled by the lowermost tier of solenoids 52. The stems 150 of the second row from the left in Figure 7 are somewhat longer than the stems 146 and cooperate with slides 152 controlled by the second tier of solenoids from the bottom. In a similar manner the stems 154 of the third row of punches from the left in Figure 7 are somewhat longer than the stems 150 of the second row and cooperate with slides 156 controlled by the third tier of solenoids 52 from the bottom and lastly the fourth or innermost row of stems 158 are still longer than the stems 154 and cooperate with slides 160 controlled by the topmost tier of solenoids 52. As also shown in Figures 3, 6 and 7, the solenoids 52 are arranged in two banks, one on each side of the bank of the punches 134, and each bank of solenoids 52 comprises four tiers of four solenoids each, making a total of 32 solenoids in the two banks, one for each punch.

Again referring to Figures 6, 7 and 8, each vertical column of four solenoids 52 in each of the two banks has its plungers connected to slide operating levers fulcrumed upon a common vertical shaft, whereby the slides which control the operations of the transverse rows of four punches each nearest the respective banks of solenoids 52 in Figure 6 are controlled by the vertical columns of solenoids 52 in the respective banks nearest thereto.

In a similar manner the second vertical column of solenoids from the inside in each bank, in Figure 6, is connected to the slides controlling the second row from the outside at each end of four punches each. The third vertical column of solenoids from the inside in each bank is connected to the third row from the outside at each end, of four punches each, and the outermost vertical column of solenoids in each bank is connected to one of the two innermost rows of four punches each in the left-hand punch bank in Figure 6.

Referring again to Figures 3, 6, 7 and 8, and more particularly to Figures 6, 7 and 8, it will be seen that each vertical column of solenoids 52 has its respective plungers connected to levers fulcrumed upon a vertical shaft, there being eight of these vertical shafts for the eight vertical columns of solenoids 52. Of these vertical shafts the innermost two, 162 have thereon the fulcra for the levers 164, 166, 168 and 170 which are connected respectively to the slides 148, 152, 156 and 160 that control the operations of the punches 134 in the outside transverse rows of four punches each, that is, the two rows of four punches each of the bank of punches 134 which are nearest the innermost two vertical columns of solenoids. In a similar manner the two posts 172 carry the fulcra of similar but longer armed levers which operate the slides 148, 152, 156 and 160 that control the operations of the second row from each end of four punches each, the two posts 174 carry the fulcra of the still longer armed levers which operate the slides that control the operations of the third row from each end of the bank of punches 134 and the posts 176 carry the fulcra for the slide operating levers, having the longest arms, which operate the slides controlling the operations of the innermost two rows of four punches each of the bank of punches 134.

It will be noted that the two arms of each of the levers 164, 166, 168 and 170 on any one post are of equal length so that the slide movement is always equal to the solenoid plunger movement. The solenoid plunger movements being uniform for all the solenoids 52, the operative movement of each slide is the same as that of every other slide. As shown in the lower part of Figure 6, each solenoid plunger 53 is normally held in its projected position by a spring 55 and is limited in its inward movement by a flange 57.

It will be noted that the levers fulcrumed on the two posts 172 are respectively operated from the plungers of the vertical column of solenoids which is second from the inside of each of the two banks of solenoids 52, that the levers fulcrumed on the two posts 174 are respectively operated from the column of solenoids which is third from the inside of each of the two banks of solenoids 52, and that the levers fulcrumed on the two posts 176 are respectively connected to the plungers of the outermost vertical column of solenoids 52 of each of the two banks of solenoids 52.

Figure 8:
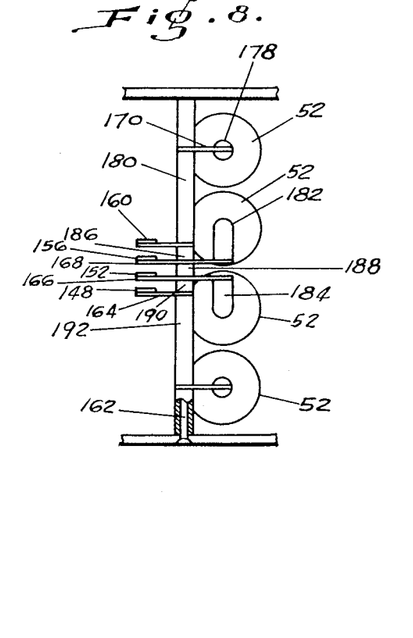
Figure 8 is a section on the line 8—8 of Figure 6.

To permit the plunger extension 178 of the uppermost solenoid 52 to operate a lever connected to a slide 160 that is spaced only a short distance from the slide 156, the lever 170 has its two arms offset along the fulcrum post and positively connected by a sleeve 180 on said post. In the case of the levers 168 and 166 as shown in Figure 8, these are brought into their proper relations to the slides 156 and 152 by offsetting the plunger extensions 182 and 184 of the solenoids 52 which are second and third from the top of the column so as to bring these levers into the relations to the other two levers shown in Figure 8. The lever 168 may be spaced on the fulcrum post from the lever 170 by means of a collar 186. The lever 166 may be spaced from the lever 168 by means of a second collar 188 on the fulcrum post and the lever 164 may be spaced from the lever 166 by means of a third collar 190. The two arms of the lever 164, like the two arms of the lever 170, are offset from each other along the fulcrum post to permit operation of said lever by the lowermost solenoid 52 by means of a sleeve 192 positively connected to the two lever arms and forming part of the lever.

From an inspection of Figure 3 it will be seen that the mechanism which controls the selection of the punches to be operated is carried by a housing 194 which has therein solenoid containing chambers 196 having inner walls 198 and 200 between which extend rods 204, 206, 208 and 210, there being five of the respective rods 204, 206, 208 and 210 in each set arranged in a vertical tier so that there is a rod 204 and a rod 206 beneath each slide 160, 156, 152 and 148 to support it in its sliding movements above the respective punch stems 146, 150, 154 and 158, and also a pair of these rods 204 and 206 above the uppermost slide 160 which are moved into pressing relation thereto when the punch mechanism is operated as hereinafter more fully set forth. The rods 208 and 210 cooperate with the right hand bank of punches 134A in Figures 3, 6, 7 and 8, the operation of which will be described hereinafter.

It will be seen from an inspection of Figure 7 that each vertical set of four slides 148, 152, 156 and 160 has openings therein arranged as follows:

The lowermost slide 148 has an opening 212 therein which, in the inoperative position of said slide, is located directly above the stem 146 of the outermost punch of one of the transverse rows of four punches each so that, unless that solenoid of the lowermost tier of solenoids which controls this particular slide has been energized when the entire bank of slides is depressed, the slide 148 controlling the stem 146 will pass down over this stem without causing this punch to operate. To insure that none of the slides 152, 156 and 160 above the slide 148 shall engage the stem 146 and operate the punch controlled by the slide 148, each of these slides is also provided with an opening to receive the stem 146, the opening 214 in the slide 152 being long enough to permit passage therethrough not only of the stem 146 of the outermost punch of the transverse row of four punches, but also the longer stem 150 of the next to the outermost punch of said transverse row of four punches. For the same reason the opening 216 in the slide 156 is long enough not only to permit free passage therethrough of the stems 146 and 150, but also the still longer stem 154 of the third punch from the outside of the transverse row of four punches and the opening 218 in the slide 160 is long enough to permit the free passage therethrough of all four stems 146, 150, 154 and 158 when this slide is in its normal inoperative position.

At the right of each opening 212, 214, 216 and 218 in the respective slides 148, 152, 156 and 160 is a stop adapted to be moved into position, when the appropriate solenoid is energized, to engage the upper end of the associated punch stem to cause the operation of the punch in the manner more fully set forth hereinafter. The stop 220 in the slide 148 is just to the right of the upper end of the stem 146, when the slide 148 is in its normal inoperative position and is movable over the upper end of the stem 146 when the solenoid 52 controlling the slide 148 is energized to move said slide to the left in Figure 7. To permit such movement of the slide 148 it will be seen that this slide must also be provided with an opening 22 therein through which the stems 150, 154 and 158 may extend, the opening 222 being sufficiently long to permit movement of the slide 148 sufficient to bring the stop 220 over the upper end of the stem 146 without engagement with the other stems. In a similar manner the slides 152, 156 and 160 are provided with stops 224, 226 and 228 arranged to be moved over the upper ends of the respective stems 150, 154 and 158, the slides 152 and 156 being also provided, at the right hand sides of their respective stops 224 and 226, with openings 230 and 232 to receive the punch stems which extend thereabove, such an opening in the slide 160, at the right of the stop 228, not being required since no stem extends through the slide 160 when the parts are in their normal inoperative positions.

From the foregoing description it will be seen that any one or more of the four punches 134 in one of the transverse rows of four punches each can be caused to operate by energization of the appropriate solenoids 52 in a vertical column of solenoids such as is shown in Figure 8. It will also be noted that if any one or more of the solenoids in a vertical column such as shown in Figure 8 is not energized, the slide controlled thereby will remain in its normal inoperative position and will not actuate the punch which it controls nor interfere with the actuation of the other punches, the solenoids controlling which have been energized.

As hereinabove suggested, the punch selecting mechanism, including the solenoids 52, the slides 148, 152, 156 and 160, the connections between the solenoid plungers and said slides and the cross rods 204, 206, 208, 210, are carried by the housing 194, the cross rods being also guided and supported near their points of operation of the punches by plates 234 and 236 depending from the upper wall of the housing 194. The weight of these parts is considerable and this weight is usually sufficient for effecting the movement of the punches 134 through the tape in the tape guide 142 and into the lower punch guides or receiving openings 144.

To permit such movement of the parts carried in the housing 194 relative to the housing 136 in which the punches 134 are located, the housing 136 is supported on four vertical posts 238 which extend through openings 240 in the partition plate 137 on which the housing 136 is mounted, these posts 238 being connected to a supporting plate 242 resting upon cams 244 and 246, of identical contour, carried on and affixed to a shaft 248. Springs 250 surrounding the posts 238 and located between the under side of the partition plate 137 and the post supporting plate 242 serve to cushion the return movement of the punches and to prevent back lash in the movements of the punching mechanism.

The shaft 248, as shown more particularly in Figure 3, is coaxial with the shaft 102 which is driven from the shaft 94 by means of the driving pulley 95, V-belt 98 and V-belt pulley 100 mounted on and affixed to the shaft 102. Affixed to the shaft 102 is a notched collar 252 which overlaps the end of the coaxial shaft 248 but is normally free to turn thereon.

Keyed to the shaft 248 is a disc 254 having pivoted thereon at 256 a dog 258 adapted to engage any one of the notches 260 in the notched collar 252. A coil spring 262 urges the dog 258 toward its notch-engaging position. Pivoted between ears 264 on the under side of the partition plate 137 is an arm 266 normally urged against a stop pin 268 by a spring 270 and arranged to be moved in the opposite direction by a connection 272 to the movable core 273 of the solenoid 274. The arm 266 has thereon an inclined flange 276 adapted to serve as a dog-lifting cam, the flange 276 being normally in the path of movement of a pin 278 carried by the dog 258.

Figures 4, 5:
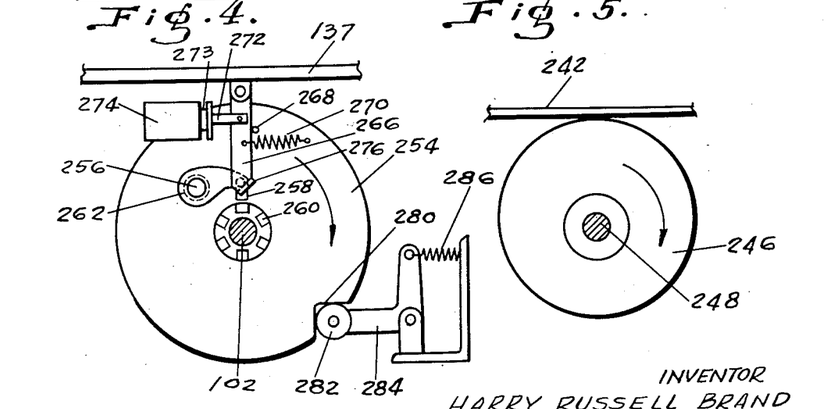
Figure 4 is a section on the line 4—4 of Figure 3.
Figure 5 is a section on the line 5—5 of Figure 3.

From the foregoing description it will be seen that when the arm 266 is resting against the stop pin 268 the flange 276 will be in the path of movement of the pin 278 on the dog 258 and the dog will be lifted into the position shown in Figure 4 of the drawings out of engagement with the notch 260 in collar 252. When, however, the solenoid 274 is energized the arm 266 will be pulled to the left in Figure 4 far enough to permit the pin 278 to ride off the flange 276, thus permitting the spring 262 to move the dog 258 into engagement with one of the notches 260 on the collar 252. When this happens it will be seen that the disc 254 will be locked to the collar 252 by the dog 258 and thus the shaft 248 will be clutched to the shaft 102 to turn therewith. Turning of the shaft 248 will effect the turning therewith of the cams 244 and 246 and therefore the lowering of the supporting plate 242 and the punches supported thereby to cause the selected punch or punches to punch the tape.

The closing of the circuit through the solenoid 274 is only temporary and therefore as soon as the circuit is again broken the core 273 of the solenoid will move back to its projected position, this solenoid and core having the same construction as that of the solenoids 52 shown in Figure 6, and the arm 266 will move back against the stop 268 thus bringing the cam flange 276 into the path of movement of the pin 278 on the dog 258, thereby causing the lifting of the dog out of the notch 260 in the collar 252, with which it had been engaged, and disconnection of shaft 102 from shaft 248. Provision is preferably made for stopping the shaft 248 with the cams 246 in their high position, that is, with the punches raised out of punching relation to the tape in the tape guide 142, and to this end the disc 254 is provided with a notch 280 into which a check roller 282 on a bellcrank 284 is constantly urged by a spring 286, this stop roller 282 serving to stop the disc 254 and therewith the shaft 248 after the disc 254 is unclutched from the collar 252, the stopping position being that shown in Figures 4 and 5, with the cams 244 and 246 in their high positions.

As hereinafter suggested, provision is made not only for punching in the tape the code symbol indicating the number of cases, crates or other wholesale lots of a particular commodity required to replenish the stock of that commodity in the retail establishment after a day's operations, but provision is also made for punching in the tape, in appropriate relation to the case controlling symbol, a code symbol designating the commodity to be replenished. As hereinabove pointed out, the commodity quantity selector switch, which has been described, closes the respective circuits through the contacts, which correspond to the numbers of cases, crates or other wholesale lots of the respective commodities required to replenish the retail stock, in a predetermined commodity sequence. It will be understood, however, that, at the end of a day's operation, there may be a number of commodities of which no sales have been made and of which, therefore, the stock has not been at all depleted. To avoid wasting tape by feeding the tape through the punching machine in continuous synchronism with the movement of the brush over the commodity quantity selector switch, provision is made for so synchronizing a commodity code controlling switch with the commodity quantity switch that there will be punched in the tape, opposite each commodity requiring replacement, a code designation appropriate thereto, so that the tape will have thereon a record that may be used to actuate automatic dispensing mechanism to release both the designated commodity and the appropriate number of cases, crates or other wholesale lots required for replenishment of the stock of the retail establishment.

Figure 12:
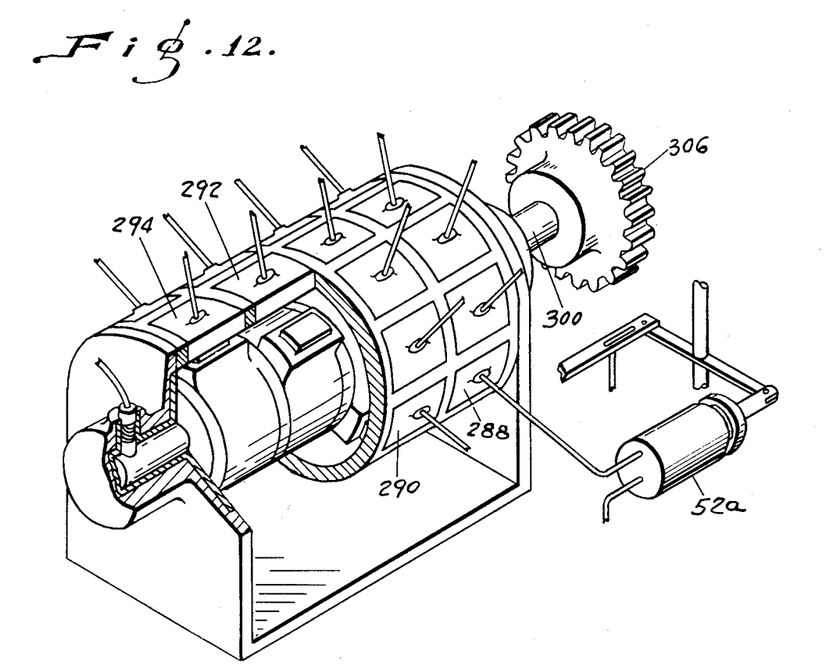
Figure 12 is a perspective view of the commodity code number selector switch mechanism intergeared or synchronized with the commodity selector switch of Figure 9 to insure operation of the two switches in synchronism, whereby punching mechanism may be actuated to provide in the tape a record of the code number of the commodity opposite the record of the quantity of the commodity required for replenishment.
Figure 13:
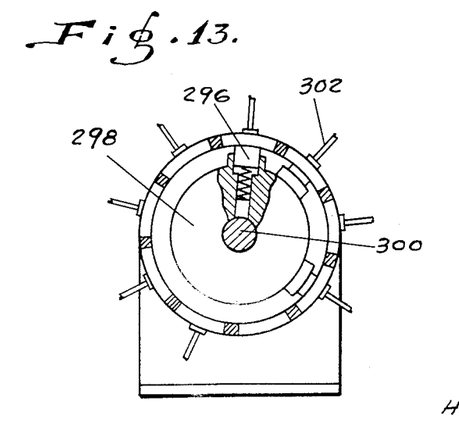
Figure 13 is a transverse section through the commodity code number selector switch of Figure 12.

To this end there is connected to the commodity quantity selecting switch, to move in synchronism therewith, a commodity code designation controlling switch. The commodity code designation controlling switch, shown in Figures 12 and 13, comprises a cylinder having thereon four circular rows of contacts 288, 290, 292 and 294 so arranged that brushes 296, mounted upon collars 298 on a shaft 300, may engage the inner faces of these contacts, the collars 298 being so mounted on the shaft 300 that they are operated after the manner of a mechanical counter. In other words, that collar 298, the brush 296 of which cooperates with the contacts 288 of the first circle, as it makes a complete rotation with the shaft 300 will advance the collar 298, the brush 296 of which cooperates with the inner faces of the contacts 290 of the second circle one step, that is, from the 0 or non-circuit-closing contact position to the No. 1 contact position. Likewise, after the collar, the contact 296 of which engages the inner faces of the contact plates 290 of the third circle, has turned through a complete circle it will then engage and advance the collar 298, the brush 296 of which engages the inner faces of the contact plates 292 of the fourth circle one step. This makes possible, with a small device such as shown in Figures 12 and 13, the setting up of a large number of code combinations. For example, if there are eight live contact plates in each circle and one zero or non-circuit-closing plate in each circle, then there is a possibility of 7379 code combinations of the 32 punches 134 of the right hand bank in Figure 6, the solenoids 52a of which are controlled by the commodity code designation switch just described.

As hereinabove suggested, each of the circular rows of contacts 288, 290, 292 and 294, in the illustrative embodiment of the invention, comprises eight live contacts each and one dead contact or zero point each, the live contacts being respectively connected by wires 302 to the solenoids 52a of the right hand bank of solenoids in Figures 3 and 6, there being 32 live contacts and 32 solenoids 52a controlling 32 punches, all so arranged, as above suggested, that a large number of code combinations of the 32 punches can be made, the illustrative embodiment making possible 7379 code combinations.

As hereinabove pointed out, the commodity quantity selector switch, which closes the circuit to the punch of the left hand bank that punches the indication for the number of cases of a given commodity required to replenish the retail stock, is operated in synchronism with the commodity code designation switch, as shown in Figure 2, the commodity selector switch being driven by a V-belt 106 connecting a pulley 104 on the shaft 102 with the pulley 78 on the shaft 77 and the commodity code designation switch being driven from a gear 304 on the shaft 102 which meshes with a gear 306 on the shaft 300 on which the brushes 296 are mounted. It will thus be seen that every advance of the brush 70 of the commodity quantity selector switch along its spiral path of travel over the contacts 66 produces a corresponding movement of the shaft 300 and a corresponding advance of the brush or brushes 296 mounted thereon. However, as shown by the wiring diagram in Figure 17, unless there has been a depletion of the retail stock of a commodity of at least one case, crate or other wholesale lot, no circuit will be closed through the commodity quantity selector switch. Unless the circuit be closed through the commodity quantity selector switch, as shown by the wiring diagram in Figure 17, the solenoid 308, controlling a relay switch 310 which closes the circuit through the punch operating solenoid 274, will not be closed nor will the circuit through the commodity code designation switch be closed. Thus there will be no setting of the punches 134 either for the commodity quantity number or for the commodity code designation and no operation of the punches.

To prevent a needless feeding of the tape when replenishment of a particular commodity is not required the solenoid 312, which controls the operation of the tape feeding mechanism, is also included in the circuits controlled by the relay 310 so that feeding of the tape will only take place after the solenoid 308 has been first energized and then again deenergized.

The illustrated tape feeding mechanism is designed for use with removable tape spools 314 and 316 similar to those employed with photographic film. These spools are arranged to be positioned, respectively, between supports 318 and 320 at one end and 322 and 324 at the other end, the supports 318 and 322 carrying spring pressed centering devices 326 and 328, respectively, having manipulating knobs at their outer ends, as shown. The respective spools may thus be clamped in rotating position between the supports and released by the knobs when it is desired to remove them.

The spool 316, upon which the tape is to be wound, is supported at one end upon a spool driving shaft 330, similar to those used in driving the rolls or spools of cameras, the shaft 330 being arranged to be driven by a V-belt pulley 332 connected by a V-belt 334 to a pulley 336 on a shaft 338. The tape 340 to be fed is preferably provided with lateral perforations 342 to insure feeding definite distances between successive punching operations and the shaft 338 carries toothed wheels 343, the teeth of which fit into the perforations 342 on the two sides of the tape. Since the size of the roll of tape on spool 316 increases as the tape is fed, provision is made for allowing the V-belt 334 to slip on pulley 332 as the size of the roll increases.

The feeding of the tape one step is brought about as follows:

Mounted on the shaft 338 is a gear wheel 344 which meshes with the gear wheel 346 on a shaft 347 that is in alignment with the shaft 348. Mounted on the shaft 348 are a notched wheel 350 and a gear wheel 352 meshing with the gear 96 on shaft 94. Mounted on the shaft 347, which carries the gear 346, is a disc 354 having pivoted thereon a dog urged by a spring about its pivot, not shown, toward the notches in the notched wheel or collar 350 and normally held out of engagement with said notches by a cam flange 358 engaging a pin 360 on the dog 356, the cam flange 358 being carried on the lower end of a lever 362 fulcrumed at 364 on a wall of the housing 366, which encloses the apparatus, and urged toward dog retaining position by a spring 368. The lever 362 is rocked into dog-releasing position by the engagement with the pin 369 or lever 362 of a trigger 370 carried by a lever 372 fulcrumed at 374 on the wall of the aforementioned housing, the trigger 370 being held normally against a stop 376 by a spring 378 and the upper end of the lever 372 being connected to the extension 380 of the solenoid core 382 of the solenoid 312 which controls the actuation of the tape feeding mechanism. Movement of the trigger 370 by the lever 372 is sufficient to carry the trigger past the pin 369 at the end of the rocking movement of lever 362, thus permitting lever 362 to return to its Figure 1 position under the action of spring 368. In this position its cam flange 358 will engage pin 360 on dog 356 and lift the dog out of engagement with the notched wheel 350 at the end of one rotation of the disc 354.

From the foregoing description the operation of the step-by-step tape feeding mechanism will readily be understood. It will be seen that if the parts be in the position shown in Figure 1 and the solenoid 312 be energized, the pull on the upper arm of the trigger carrying lever 372 will rock the lever 372 in a clockwise direction in Figure 1 and thus rock the cam flange lever 362 in a counterclockwise position, thereby releasing the dog 356 to permit it to engage with one of the notches in the notched wheel 350 turning constantly with the shaft 348 whereby the disc 354 on the shaft 347 will be clutched to the notched wheel 350 and the shaft 347 will be turned in unison with the shaft 348. Turning of the shaft 347 turns the gear 346 which is meshed with the gear 344 on the tape driving shaft 338.

As above pointed out, the trigger 370, at the end of its lever rocking movement, passes by the pin 369 and permits lever 362 to return to its dog tripping position. Trigger 370 cannot again rock lever 362 until after solenoid 312 has been deenergized. This will not take place until solenoid 308 has again been energized.

To insure stopping of the disc 354 at the same angle of rotation at the end of each tape feeding step, the disc is provided with a notch 384 into which a check roller 386 on a bellcrank 388 is constantly urged by a spring 390.

From the foregoing description of the construction and operation of the various elements which go to make up the machine for translating the operations of retail dispensing mechanism into records of such character that they may be used for controlling the operations of automatic warehouse dispensing mechanism to replenish the stocks of various kinds of goods or commodities which have been depleted by the operations of the retail dispensing mechanism over a given period of time, the operation of the mechanism as a whole will readily be understood.

Referring particularly to the wiring diagram in Figure 17, it will be seen that, whenever a switch 2, which controls the release of a selected commodity from its chute, is closed by the action of the pin 4, which may be key operated or may be a feeler pin, as more fully disclosed in my co-pending application Serial No. 705,137, filed October 23, 1946, the circuit thus completed includes not only the solenoid 6 that operates to release the selected commodity but also the solenoid 8 that operates through the connections shown to turn the ratchet wheel 20 of the item register one notch and therewith affect the turning of the disc 26 a corresponding angular distance, there being a ratchet wheel 20 and a disc 26 for each commodity handled by the retail establishment. The number of teeth on the ratchet wheel 20 of the item register will vary with the character of the commodity, that is, with the number of individual items put up in the case, crate or other wholesale lot as it is delivered at the warehouse. If, for example, as shown in Figure 14, the case or crate contains 24 individual packages or cans or units, then there will be provided 24 ratchet teeth on the ratchet wheel 20 of the item register so that the disc 26 will complete a rotation when 24 of the packages, cans or other individual units of the particular commodity have been dispensed and, in doing so, will cause the pin 28 on the disc 26 to move the contact member or brush 34, carried by the disc 32 of the lot register, into position over the contact 40 which controls the punch for punching the tape for a single case or crate.

If, at the end of the day's operations, the commodity represented by the registering mechanism shown in Figures 14 and 15 has been dispensed to such an extent that 16 full crates, cases or other wholesale lots are required to replenish the stock, the brush 34 of the lot register will be left on the contact 40 controlling the punch which punches the tape for 16 cases or crates of this particular commodity. The item register for any particular commodity may, however, show, for example, 14 units dispensed, in addition to the units which make up the 16 cases or crates shown on the lot register, but these additional units will not affect the position of the brush 34 of the lot register, which controls the selection of the punch for punching the tape, but will remain on the item register, that is, on the ratchet wheel 20, to be carried over into the next day's operation, leaving each commodity item register set with any units that have been dispensed over a full crate, case or other wholesale lot.

When the day's operations have been completed, it will be seen that the totals of cases, crates or other wholesale lots required to replenish the stocks of the various commodities dispensed during the day will have been accumulated upon the lot registers, that is, the registers which indicate, by the positions of their brushes 34, the number of full cases, crates or other whole lots dispensed, but that no permanent record or records that could be used in operating the warehouse dispensing mechanism will have been made because the circuits controlling the operation of the punches, which punch the commodity quantity code indications on the tape 340 and also punch the commodity code designation on the tape, have not been closed. The closing of these circuits will be more fully understood by reference to Figures 9 to 13 inclusive.

As shown in the wiring diagram in Figure 10, the motor 90, which drives the commodity quantity circuit closer shown in Figures 9 to 11 and also drives, in synchronism therewith, the commodity code designation circuit closer shown in Figures 12 and 13, is set in operation by the movement of the switch member 116 connected to one side of the circuit, here shown as the positive side 122, into engagement either with the terminal 118 or the terminal 120. The engagement with the terminal 120 causes the motor 90 to rotate in the direction to drive the brush 70 successively over the contacts 66 of the commodity quantity circuit closer from left to right and thus close in succession, as shown in Figure 17, any circuits through the successive commodity lot registers that have been set to show required replenishments of the respective commodities. At the same time the energization of each of the successive punch setting circuits controlled by the commodity quantity circuit closer, shown in Figures 9 to 11, inclusive, effects through the simultaneous energization of the solenoid 308, the closing of the circuit through the commodity code designation punch setting solenoid or solenoids 52a and also through the punch actuating solenoid 274. Breaking of the circuit through solenoid 308, after each energization thereof, permits operation of the tape-feeding mechanism, as hereinabove set forth.

As shown more fully in Figure 10, the movement of the brush 70 spirally over the contacts 66 will continue until the threaded end of the shaft 77 has advanced so far to the right in Figure 10 that the shaft engages the arm 108 of the switch 113 and breaks the motor operating circuit through the contact 120. This completes the tape-punching operation.

To restore the parts to their original positions the operator then swings the switch 116 into engagement with the contact 118. This reverses the motor and causes the shaft 77 to turn in the opposite direction so that the screw threads thereon will cause it to move to the left in Figure 10, together with the brush 70, until the left hand end of the shaft 77 strikes the arm 126 of the switch 128 and breaks the circuit to the motor 90 through the contact 118.

The commodity code designation circuit closer being connected to the commodity quantity circuit closer to turn in synchronism therewith, the mechanism which restores the commodity quantity circuit closer to its initial position will serve also to restore the commodity code designation circuit closer to its initial position.

Figure 18:
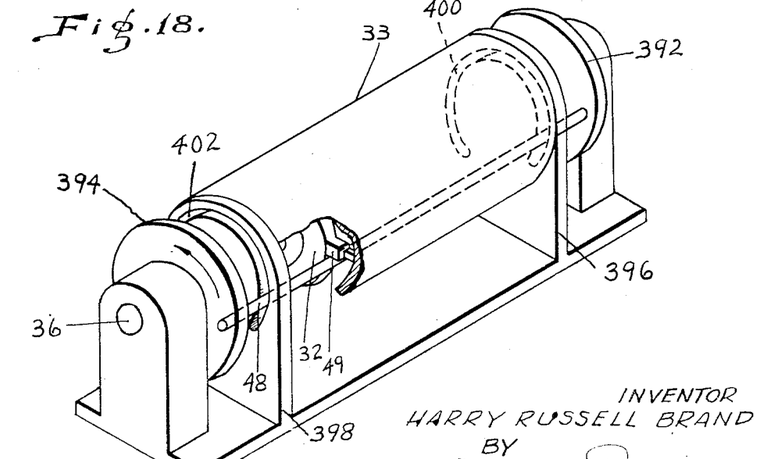
Figure 18 is a perspective view somewhat diagrammatic illustrating the means and method for simultaneously restoring the lot registers to zero.

It is, of course, also important to restore to zero position, after the tape punching operation, each of the commodity lot registers. Such restoration may be effected manually and simple means for effecting such restoration is shown somewhat diagrammatically in Fig. 18. As shown in Fig. 18, the stop 48 with which the boss 49 on the disc 32 engages when the maximum capacity of each register is reached is arranged to be moved through a circular path to engage the bosses 49 of each of the discs 32 and move all of the discs simultaneously back to the zero position of the brushes 34, that is, into engagement with the first insulating segment 38. To this end there are mounted on the shaft 32 wheels 392 and 394 located beyond the two ends of the lot registering cylinders 33 which is common to all the lot registers. The cylinder 33 is supported upon end brackets 396 and 398 and the stop rod 48 extends through slots 400 and 402 in these cylinder supporting brackets, the slots 400 and 402 being concentric with the shaft 36. The ends of the stop rod 48 are carried by the wheels 392 and 394 and these wheels may be turned in any suitable manner as, for example, by hand to cause the rod 48 to restore all the lot registers to their zero position and then to carry the rod back to its position shown in Fig. 14.

What is claimed as new is:

1. Apparatus for the purposes set forth having, in combination, a plurality of item registers adapted to be operated respectively from a corresponding plurality of commodity dispensing means to register the number of items of each of a plurality of commodities dispensed by said means, a lot register associated with each item register and intermittently operable therefrom to register wholesale lots as they are successively accumulated on the associated item register, tape punching mechanism, including electromagnetically operated punch selecting means controllable from said lot registers, for making a tape record appropriate to the number of lots registered on each lot register, and means for causing the successive punch selecting operations of the punch selecting means to take place in a predetermined lot register sequence.

2. Apparatus according to claim 1 in which the punch selecting means comprises lot number registering contacts common to all lot registers, a contact selecting brush for each lot register, a separate circuit connection to each lot register brush and circuit closing means arranged to effect, in succession, the closing of a punch selecting circuit through each lot register brush which is in engagement with a lot number contact.

3. Apparatus according to claim 1 in which the tape punching mechanism includes also electromagnetically operated means for selecting commodity code number punches, said means comprising contacts in selecting circuits to punches representing the respective digits of the commodity code number and contact selecting brushes operated in synchronism with the means for successively closing circuits through the lot register contact engaging brushes.

4. Apparatus according to claim 1 in which the tape punching mechanism includes also electromagnetically operated means for selecting commodity code number punches, said means comprising contacts in selecting circuits to punches representing the respective digits of the commodity code number and contact selecting brushes operated in synchronism with the means for successively closing circuits through the lot register contact engaging brushes, the circuit connections including a relay switch in the code number punch selecting circuit and a relay magnet in the lot register circuit whereby closing of the commodity code number punch selecting circuit is dependent upon the closing of a circuit through the corresponding lot register.

5. Apparatus according to claim 1 which includes also electromagnetically operated means for selecting commodity identifying code punches, said last mentioned means being mechanically synchronized with the punch selecting means for the lot registers to operate also in a predetermined lot register sequence.

6. Apparatus for the purposes set forth having, in combination, a plurality of item registers adapted to be operated respectively from a corresponding plurality of commodity dispensing means to register the number of items of each of a plurality of commodities dispensed by said means, a lot register associated with each item register and intermittently operable therefrom to register wholesale lots as they are successively accumulated on the associated item register, tape punching mechanism, including electromagnetically operated punch selecting means controllable from said lot registers, for making a tape record appropriate to the number of lots registered on each lot register, and means for causing the successive punch selecting operations of the punch selecting means to take place in a predetermined lot register sequence comprising lot number registering contacts common to all lot registers, a contact selecting brush for each lot register, separate circuit connections to the respective lot register brushes including contacts in a predetermined series arrangement and a circuit-closing brush connected to one circuit terminal and movable in a defined path over said last-mentioned contacts into successive circuit closing engagements therewith.

7. Apparatus according to claim 6 in which the last-mentioned contacts are exposed in a spiral arrangement on the inner wall of a cylinder and the circuit-closing brush moves about and along the axis of said cylinder in a corresponding spiral path of travel.

8. Apparatus according to claim 6 in which electrically-driven, operator-actuated means are provided for effecting the circuit-closing and the return movements of said last-mentioned brush and means are also provided for automatically stopping said brush at the end of each of said movements.

9. Apparatus according to claim 6 which includes also electromagnetically operated means for selecting commodity identifying code punches, said last mentioned means being synchronized with the movments of the circuit-closing brush as it successively closes circuits through the lot registers on which one or more lots are registered.

10. Apparatus according to claim 6 which includes also electromagnetically operated means for selecting commodity identifying code punches, said last mentioned means being synchronized with the movements of the circuit-closing brush as it successively closes circuits through the lot registers on which one or more lots are registered, the code punch selecting means being so connected to the brush for successively closing the circuits through the lot registers showing lot registrations that said means is energized to select commodity code number punches only when a lot register circuit is completed.

HARRY RUSSELL BRAND.

REFERENCES CITED

The following references are of record in the file of this patent:

UNITED STATES PATENTS

| Number | Name | Date |
| --- | --- | --- |
| 898,675 | Parr | Sept. 15, 1908 |
| 1,974,191 | Nelson et al. | Sept. 18, 1934 |